United States Patent [19]

Kalyon et al.

[11] Patent Number: 5,584,071
[45] Date of Patent: Dec. 10, 1996

[54] DISPOSAL METHOD AND APPARATUS FOR HIGHLY TOXIC CHEMICALS BY CHEMICAL NEUTRALIZATION AND ENCAPSULATION

[75] Inventors: Dilhan M. Kalyon, Teaneck; Suphan Kovenklioglu, Chatham, both of N.J.

[73] Assignee: The Trustees of the Stevens Institute of Technology, Hoboken, N.J.

[21] Appl. No.: 138,538

[22] Filed: Oct. 15, 1993

[51] Int. Cl.⁶ .................................................. A62D 3/00
[52] U.S. Cl. ..................... 588/200; 588/205; 588/255; 588/258; 588/901
[58] Field of Search .................... 588/200, 205, 588/255, 257, 258, 901

[56] References Cited

U.S. PATENT DOCUMENTS

| | | | |
|---|---|---|---|
| 3,810,788 | 5/1974 | Steyermark | 588/200 |
| 4,009,116 | 2/1977 | Bahr et al. | 588/255 |
| 4,772,430 | 9/1988 | Sauda et al. | 588/255 |
| 5,376,156 | 12/1994 | Schraufstetter | 588/255 |
| 5,377,604 | 1/1995 | Pichat | 588/257 |

FOREIGN PATENT DOCUMENTS

| | | | |
|---|---|---|---|
| 2676368 | 11/1992 | France | 588/200 |
| 4114560 | 11/1992 | Germany | 588/200 |
| 53-113763 | 10/1978 | Japan | 588/255 |
| 54-037070 | 3/1979 | Japan | 588/255 |
| 2108310 | 5/1983 | United Kingdom | 588/255 |

*Primary Examiner*—Gary P. Straub
*Attorney, Agent, or Firm*—Pennie & Edmonds

[57] ABSTRACT

An apparatus and method for disposing of highly toxic chemicals including the steps of chemical neutralization of the highly toxic chemical so as to substantially detoxify the chemical and encapsulation of the neutralized highly toxic chemical in a material which shields the neutralized highly toxic chemical from contact with anything outside of the encapsulation substance.

24 Claims, 6 Drawing Sheets

DISPOSAL METHOD AND APPARATUS FOR HIGHLY TOXIC CHEMICALS BY CHEMICAL NEUTRALIZATION AND ENCAPSULATION

BACKGROUND OF THE INVENTION

This invention relates to the disposal of highly toxic chemicals such as chemicals used in chemical weapons. The Department of Defense Appropriation Act of 1986 (Public Law 99–145) has directed the Secretary of Defense to destroy the chemical weapons stockpile of highly toxic chemicals in a safe and effective manner. Further, bilateral agreements between Russia and the United States direct both countries to reduce their respective chemical weapons stockpile by year 2002.

Such chemical weapons include: 1) nerve gases such as ethyl-N, N dimethyl phosphoramino cyanidate (common name Tabun or agent GA), isopropyl methyl phosphonofluoridate (common name Sarin or agent GB), o-ethyl-S-(2-diisopropyl aminoethyl) methyl phosphono-thiolate (agent VX), and 2) vesicants including bis(2-chloro ethyl) sulfide (mustard gas, agent H or agent HD), dichloro (2-chlorovinyl) arsine (Lewisite or agent L), bis(2(2-chloro ethylthio)ethyl)ester (agent T) or their combinations with each other or with other liquids. Nerve gases are highly toxic in both liquid and vapor form. Exposure of humans to sufficient concentrations of nerve gases leads to convulsions caused by uncontrolled stimulation of nerves, and death within minutes caused by respiratory failure. Exposure to vesicants leads to the blistering of exposed tissue, eye injuries and damage to the respiratory tracts from inhalation of the chemical. In addition to causing these immediate short term injuries, which can be fatal, some highly toxic chemicals are carcinogens.

It is clear that such toxic chemicals cannot be disposed of using traditional chemical disposal techniques because of the inherent dangers involved to human workers from the threat of contact with these chemicals. Further, they cannot be moved safely from one location to another because of the threat of an accidental release of the chemical during transport. In fact, U.S. Army studies have indicated that accidents occurring during the transportation of such highly toxic chemicals cannot be mitigated. However, existing stockpiles of such highly toxic substances cannot be left at their current storage locations indefinitely. Today, at least eight locations in mainland United States and Johnston Island in the Pacific, as well as seven or more locations in Russia contain storage sites for these highly toxic chemicals either in bulk storage containers or enclosed in weapons such as rockets, land mines, mortars or cartridges. It is estimated that there are 25,000 tons of such chemicals in the United States and 40,000 tons in Russia.

Since there currently does not exist a method of transporting such toxic substances, a need has arisen to dispose of these substances at their storage locations. However, complete disposal on site requires that a disposal plant be built at every site. Five technologies are currently being developed and may, in the future, provide the principal methods for disposal of such highly toxic chemicals. These are incineration, chemical neutralization, super critical water oxidation, steam gasification and plasma arc pyrolysis. All these methods incur tremendous costs in implementation. These costs, when multiplied by the number of plants which store these chemical weapons, become prohibitive.

Thus, a need exists for a disposal system that will enable the safe disposal of such highly toxic chemicals at reasonable cost.

SUMMARY OF THE INVENTION

The improved disposal method of the present invention involves the conversion of highly toxic chemical substances including chemical munitions to safely transportable inert products. The method includes the continuous chemical neutralization of the highly toxic chemicals and the continuous encapsulation of the neutralized products.

A preferred embodiment of the disposal method of the invention includes a neutralization process which is accomplished by mixing the highly toxic chemicals along with any wash solution used to clean out the chemical storage containers or weapons with a neutralization agent specifically chosen to neutralize the particular chemical. The mixing occurs in both a mixing head and in a twin screw extruder designed to ensure thorough mixing.

After neutralization, the neutralized chemical substance is encapsulated in a polymeric base substance via a twin screw extrusion process which is designed to separate the neutralized chemical substance into discrete, small sized particles (or droplets), and surround them with the polymeric base so that the chemical is not exposed to the surface of the encapsulated composition. The encapsulated composition is then coated with a layer of polymeric material to ensure total encapsulation, and the encapsulated neutralized chemical is injected into a sealed storage compartment that can be safely transported to a disposal site and disposed via one of the known disposal methods (e.g. incineration), or can be disposed of in a landfill. Further, mobile plants can be built according to the teachings of this invention and can be moved from one chemical weapons site to another, or from one chemical waste dumping site to another to dispose of the chemical weapon agents or toxic waste chemicals found at each site.

The main advantage of the invention is that the need for multiple disposal sites is eliminated because the neutralized and encapsulated products are capable of safe transport to a single disposal site. Accordingly, the costs are many times less expensive than any disposal system known today. The method of the invention ensures sufficient detoxification of the highly toxic chemicals at the plant at which they are being stored, to permit safe transport to the disposal site. Without the detoxification and encapsulation ability achieved with this inventive process, such transport would be impossible because of the danger to humans of transporting highly toxic chemicals. Further cost saving during disposal can be achieved by forming a mobile neutralization and encapsulation station. By using a mobile station, costs of building duplicative stations are eliminated.

BRIEF DESCRIPTION OF THE FIGURES

These and other objects, features, elements and advantages of the invention will be more readily apparent from the following description of the invention in which.

DETAILED DESCRIPTION OF THE PREFERRED EMBODIMENTS

Figure 1:
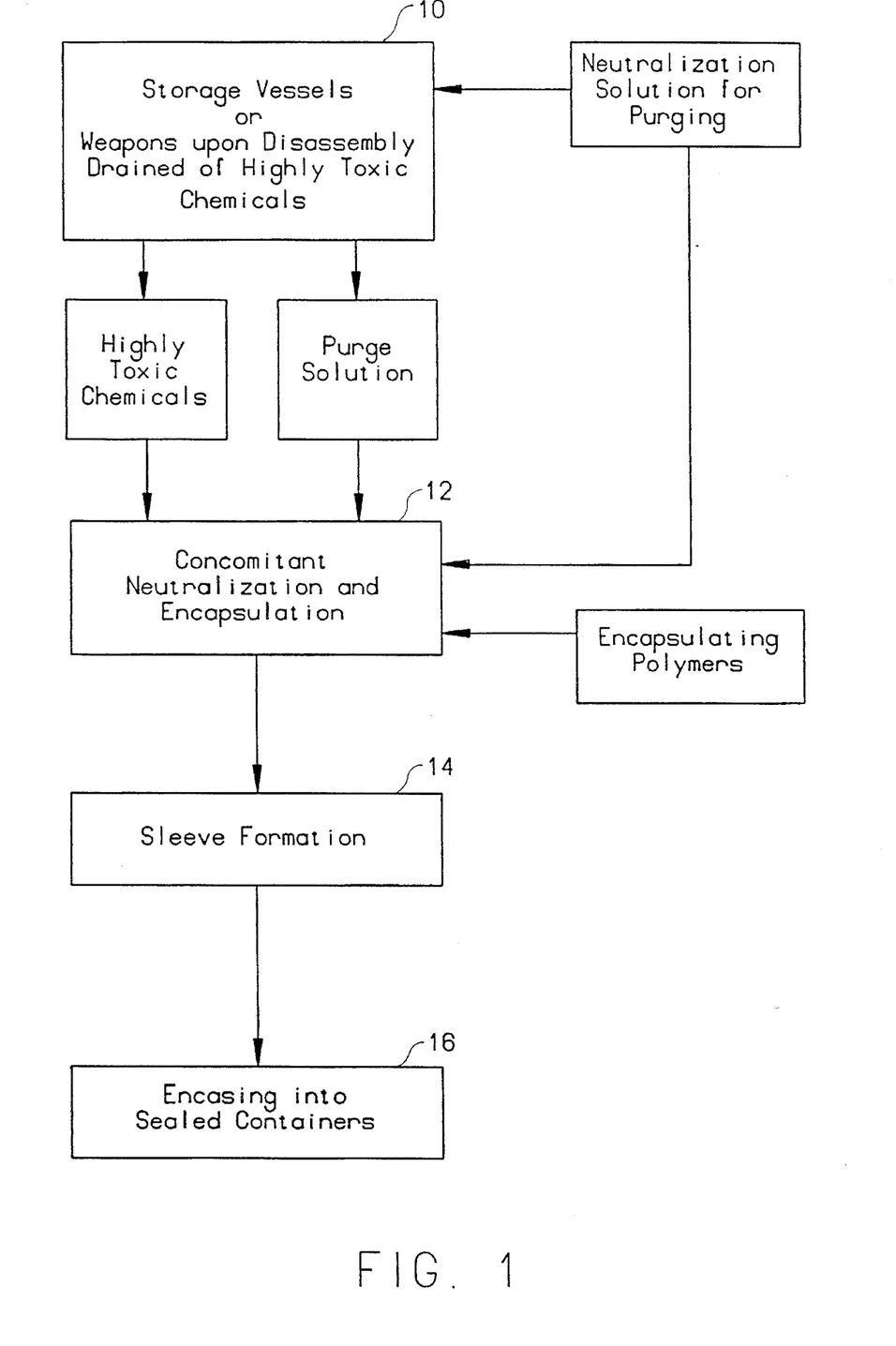
FIG. 1 is a flowchart of the overall disposal system.

The overall method of the present invention is illustrated in the flowchart of FIG. 1. The method involves the application of chemical neutralization and encapsulation technologies to produce a readily transportable product which is safe with respect to human contact.

According to the invention, storage vessels or weapons containing highly toxic chemicals are drained of the chemicals 10 and mixed with a purge solution which has been specifically selected to chemically neutralize the particular highly toxic chemical being drained. Also neutralized at this time is a wash solution which is used to wash the storage vessels or weapons to rid them of the chemical. Next, the purge solution, chemical and wash solutions are further chemically neutralized and concomitantly encapsulated via encapsulating polymer 12. The neutralized and encapsulated solution is covered by a sleeve formation 14 of polymer which is formed around the solution and designed to ensure complete coverage of the encapsulated polymer which provides protection from the neutralized chemical. The fully encapsulated, neutralized chemical is then encased in sealed containers 16. It is now ready for safe shipping to a disposal plant such as an incinerator where it can be destroyed.

Figure 2:
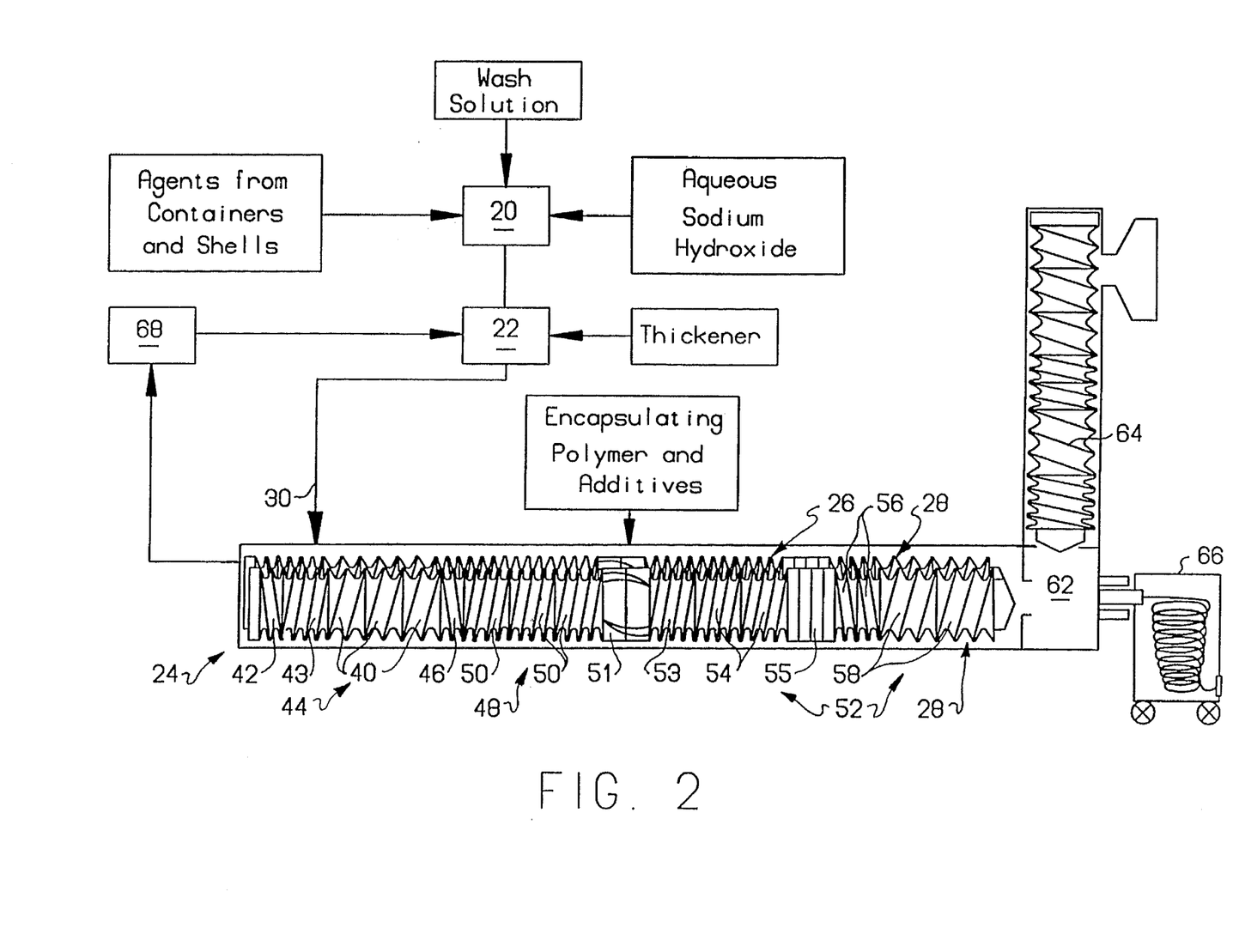
FIG. 2 is a diagrammatic representation of a preferred embodiment of the disposal technology.

FIG. 2 illustrates a diagrammatic representation of a preferred embodiment of the apparatus involved in the inventive method. In a first stage of the apparatus, the highly toxic chemical munitions liquids are mixed in a sealed mixing head 20 with a chemical neutralizing solution of an alkaline aqueous solution selected for its neutralizing properties on the particular toxic chemical. Neutralization occurs via a hydrolysis process which results from the mixture of the chemical and the aqueous solution which alters the chemical composition of both substances and detoxifies the chemical. Examples of the process include hydrolization of GB with aqueous sodium hydroxide to remove a fluoride ion, or hydrolization of VX with aqueous sodium hydroxide so that the VX molecule experiences cleavage. Both hydrolization examples yield chemical compounds which have been detoxified. Advantageously, a caustic wash solution used to neutralize any residual toxic agents remaining in drained containers is also fed into the mixing head 20 to be detoxified. One embodiment of mixing head 20 comprises a chamber which allows for the impingement of the chemical and the aqueous solution, both comprising liquid streams. To provide sufficient mixing, the impingement velocity values of the streams should be in the regime where the Reynolds number is equal to or greater than 200–500.

The first mixing stage is followed by a second mixing stage wherein the contents of the mixing head are emptied into a second mixing head 22 which is used to incorporate polymeric thickener into the neutralized solution. The thickener is generally soluble in water and increases the viscosity of the aqueous phase so that it will be suitable for processing. One example of a thickening agent is carboxy polymethylene, which is hydrophilic and water swellable. Experiments have demonstrated that a water solution of 3% NaOH and 0.5% thickener by weight, for example Carbopol 934 available from BF Goodrich, was sufficient to result in a suitably viscous solution. The mixture of chemical munitions, neutralization agents and thickener is then injected into a continuous processor 24.

Continuous processors can comprise single screw extruders, twin screw extruders, single shaft kneaders or co-rotating disk extruders. In comparison to batch mixers which can only accommodate one "batch" at a time, continuous processors can accommodate a continuous flow. Further, in comparison to batch mixers, they have interchangeable parts, are versatile, facilitate better heat transfer and better control of product quality, and hold only a fraction of the lot of a batch mixer at any time while producing at the same production rate. Thus, a continuous processor can work a material more efficiently and with better, and more closely-tailored, results.

Any of the above-described continuous types of processor can be used in the implementation of this invention. However, the invention will be described with respect to a fully-intermeshing, co-rotating twin screw extrusion process. The twin screw extruder can provide mixing, pressurization and devolatilization in a single operation. The co-rotating twin screw extruder 24 is a continuous processor having two screws 28 which work concurrently to ensure sufficient mixing, and therefore sufficient neutralization and encapsulation to ensure safety to handlers. The screws rotate in the same direction and are self-wiping. The screws are enclosed in a tightly fitting cylindrical barrel. Thus, a small clearance exists between the barrel and rotating screw elements which prevents buildup of the materials to be mixed at the wall of the extruder. A heat transfer medium is circulated within the barrel and/or screw to maintain a constant temperature in the twin screw extruder.

The twin screw extruder is equipped with a feed port 30 for feeding the mixture comprising the highly toxic chemical, the alkaline aqueous liquid used for neutralization, the wash solution and the thickener into the twin screw extruder.

Figure 3:
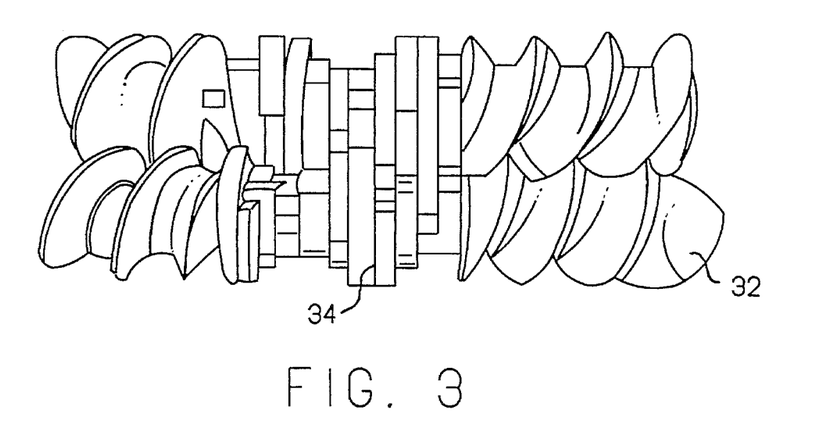
FIG. 3 is a diagrammatic representation of various twin screw extruder elements.

There are many methods of controlling the processing in the extruders to ensure proper chemical neutralization and encapsulation of the toxic chemical. The following provides a brief description of these methods. The screw elements of the twin screw extruder are modular and are chosen to accomplish the specific tasks required with respect to a particular chemical. Various screw elements are illustrated in FIG. 3 and include regular flighted screw sections 32 and lenticular kneading disc "paddles" 34. Also available are neutral disks and devolatilization elements. The elements are each utilized to accomplish specific processing functions, and are configured in an order particular to the required processes needed to neutralize and encapsulate a particular chemical. The configuration of the various elements is determined from an analysis of a variety of system parameters which are dependent on the particular chemical to be neutralized.

Each particular element can be oriented in a manner to accomplish the task at hand. For example, the screw elements can be oriented in a forward stagger 40 or reverse stagger 42 (see FIG. 2) depending on the results desired. When the stagger is in the reverse direction a pressure drop is created in the reverse section which requires a sufficient pressure rise in the mixture in order to continue the processing of the material in the extruder. Thus, the stagger of the elements create a means of controlling the pressurization of the mixture in the extruder. In addition to the element orientation, screw geometry is variable with respect to screw pitch size, angle and flight size. Thus, geometry selection is another method of controlling the flow of the material so that it will be properly processed.

In the following section, the operational principles of the extruder will be illustrated as well as the methodologies for proper selection of the screw configuration and the screw geometry. The results of the neutralization and encapsulation process depend on the extruder variables as well as the properties of the chemicals being processed. Also important in the chemical neutralization and encapsulation are the operating conditions of the system. The operating conditions are monitored via various sensors including temperature thermocouples, pressure transducers, and torque and rotational speed sensors located at various points along the twin screw extruder.

The extruder can include characterization equipment such as analytical characterization apparatus which can detail the particular toxic substance to be neutralized and encapsulated, and provide suggestions in the selection of screw elements, screw geometry, operating conditions and any other parameter of the system which will best accomplish the task with respect to the particular chemical at issue.

FIG. 2 depicts an embodiment of a suitable screw geometry for accomplishing chemical neutralization and encapsulation which generally comprises three zones: 1) the neutralization zone 44, 2) the modification zone 48, and 3) the encapsulation zone 52. The neutralization zone 44 provides a sealed region whereas the channel is completely full at both ends, in which the hydrolysis reaction achieves sufficiently high conversions (i.e., conversion from toxic chemical to detoxified chemical) of the chemical munitions to ensure a high degree of chemical neutralization. The mean residence time in the neutralization zone necessary to achieve a sufficiently high conversion of the chemical munition liquid depends on the pH and temperature of the reaction. For example, based on the published first order rate constant for the hydrolysis reaction of GB with caustic at 25° C. having a pH of 10 without any catalyst, the estimated residence time for 90% conversion is 40 minutes. [Gustafson and Martell, *J. Am. Chem. Soc.*, 82:2309 (1962)]. The weight ratios of GB to caustic (1N solution) used was 1 to 10. This is higher than the stoichiometric ratio of 1 to 7 and assures an alkaline environment throughout the reaction. It is possible to decrease this residence time by a factor of one half for each 10° C. increase in temperature. Thus, only a residence time of 5 minutes is necessary at 55° C. to achieve 90% conversion. Various catalysts can be incorporated to increase the neutralization rate even further thus decreasing the residence times.

The residence time of the chemical in the neutralization zone is controlled by varying the screw geometry. For example, in FIG. 2, the reverse staggered screw elements are included at the beginning and end of the neutralization zone to provide a pressure decrease in the flow which results in a longer residence in the zone. Further, these fully-flighted reverse screw sections are provided to form melt seals around the zone so as to enclose the chemical within the zone and ensure a greater degree of neutralization. However, the neutralization process continues throughout the length of the extruder during the modification and encapsulation zones.

An example of the screw configuration and orientation of the neutralization zone is depicted in FIG. 2. The zone begins with a fully flighted reverse staggered screw element 42 to provide sealing of the extruder from the outside. Sealing is provided by the reverse drag created in the flow by the reverse stagger element 42. This element comprises a helix angle of −5.9° with respect to the vertical axis. The diameter of the screw root is 27 mm and the pitch (i.e. axial distance between flights) of the flighted section is 12.7 mm. The channel depth of the screw is 11.9 mm and the flight width at the tip of the screw is 2.9 mm. The element comprises two screw turns. Screw elements such as kneading disks can be incorporated into the neutralization zone to generate better mixing.

The reverse stagger element 42 is followed by a forward flighted element 43 having a helix angle of 5.9° with respect to the vertical axis. The diameter of the screw root is 27 mm, the pitch is 12.7 mm, and the channel depth is 11.9 mm. The flight width at the tip of the screw is 2.3 mm. The element comprises 4 screw turns. Following elements 43, three double channel forward stagger elements 40 provide mixing and pressurization. The pitch of each element is 25.4 mm (i.e., one inch) and the channel depth is 11.5 mm. The screw root diameter is 27.9 mm, the helix angle is 22.4° from the vertical, and the flight width is 1.5 mm at the tip of the screw. Each element comprises one screw turn. Following the three forward stagger elements 40, another reverse stagger element 46 is included to create a similar seal to the reverse element 42 prior to the modification zone. The specifications of the reverse stagger element are identical to those of element 42. Thus, the mixture is maintained in the neutralization zone via the screw element geometry for the time necessary to neutralize the highly toxic chemical.

In the modification zone 48, a polymeric matrix, e.g., thermoset for relatively low temperatures, thermoplastic for higher temperatures, and various modifiers including curing agents and catalysts for thermosetting polymers, are injected into the extruder and mixed with the neutralization products emerging from the neutralization zone. The screw configuration and orientation of the modification zone generally includes only three forward stagger elements 50 for conveying and premixing the neutralization products with the polymeric matrix. The forward elements 50 have a helix angle of 5.9° with respect to the vertical axis. The diameter of the screw root is 27 mm, the pitch is 12.7 mm, and the channel depth is 11.9 mm. The flight width at the tip of the screw is 2.9 mm. Each element comprises 2 turns. These elements 50 are followed by a set of ball wing type screw elements 51, at which the encapsulating polymer and other additives are fed into the extruder through a second feed port. The ball wings are included to scrape the surface of the extruder barrel to eliminate stagnant regions.

The encapsulation zone 52, encapsulates the neutralization products in the polymeric matrix by controlling the configuration and operating conditions of the extruder. The encapsulation zone 52 continues to mix and pressurize the detoxified mixture and the polymeric matrix until the detoxified mixture is reduced to small droplets which are embedded in the polymeric matrix. The orientation and configuration of elements in this zone include the following specifications. One forward stagger element 53 having the same configuration as elements 50 and two forward stagger elements 54 having the same configuration and orientation of the element 43 in the neutralization zone are positioned at the beginning of the encapsulation zone. They continue the mixing process of the detoxified mixture and the polymer matrix and pressurize the melt. The forward stagger elements are followed by a two inch long kneading disc block 55 configured to be staggered at a 60° reverse angle. The kneading discs are used to create better dispersive mixing and to improve the distributive mixing capability, the merits of which will be discussed below. This is followed by two reverse stagger elements 56 which pressurize the preceding portions to ensure proper mixing of the detoxified mixture and the polymer matrix and provide a melt seal to the encapsulation zone. The reverse stagger element configuration is identical to those discussed with respect to elements 42 and 46 (above). The reverse stagger elements are followed by two forward stagger elements 58 with a total length of 6". These elements both pressurize the mixture and accomplish the final mixing which encapsulates the small particles of the detoxified mixture in the polymer matrix. Further they allow sufficient pressurization of the encapsulated solution to be shaped into a strand at a die 62. The forward elements 58 have a helix angle of 22.4° with respect to the vertical axis. The diameter of the screw root is 27.9 mm, the pitch is 25.4 mm and the channel depth is 11.5 mm. The flight width at the tip of the screw is 1.5 mm. Each element comprises 1.5 turns. The combination and order of the screw elements results in separating the neutralized chemical into small droplets. Other variables such as screw rotational speed, volumetric flow rate and temperature are selected to sufficiently process the mixture as well. Specifically, these parameters are selected so that encapsulation will occur without premature curing of the thermosetting matrix.

The die 62 geometry is important and must be of a length to allow for sufficient curing and shaping of the thermosetting polymer within the die and to ensure encapsulation as well as cooling and solidification of the polymer outside the die. Additionally, the die entry geometry is an important part of the twin screw extrusion technology. It is designed with care primarily to allow for the smooth transition of the material from the exit of the twin screw extrusion section into the die. The die entry should be designed to eliminate dead spots, i.e., stagnant regions where the melt could circulate indefinitely.

The extruder sections also must be designed to provide a flowable matrix to the die. For example, for thermosetting matrices, an extruder geometry which results in an improper increase of the residence time in the modification and encapsulation zone may lead to premature curing and gelation of the thermosetting matrix thus leading to stagnation at various locations at the die entry.

Stress distribution must be maintained within acceptable limits and is dependent on the amount of separation between the tips of the screws and the walls of the approach region into the die. Especially for viscoplastic materials, the stress magnitudes at every location in the entry to the die geometry should be controlled by selecting the distance of separation between the conical tips of the screws and the die.

The die is interfaced to a second extruder 64, which generally comprises a single screw extruder of a type well known in the art. This extruder provides a pressurized polymeric melt to coat the outer surface of the encapsulated mixture as it emerges from the twin-screw extruder (the emerging mixture is commonly referred to as a "strand"). This process is, thus, a co-extrusion process. Additional extruders depositing additional layers onto the strand can be included as well. For example, an adhesive layer can be deposited between the outer polymeric sleeve and the strand to ensure that the polymeric sleeve remains in place.

Once all layers have been deposited on the strand, the ends of the resultant strand are capped with the second extruder and cut. This involves halting the feeding of the chemical and neutralization agents from the twin screw extruder to allow for polymer from the single screw extruder to fill end sections of the strand thus forming seals. The encapsulated strand is then cooled outside the die and fed into sealed container 66 which can be removed safely from the disposal site. Upon the completion of a run, the extruder is purged entirely by running only the polymeric matrix for a sufficient duration of time to eliminate traces of the previous mixture. Any volatiles which are generated by the process are recycled back to mixing heads 20, 22, after being cooled in condenser 68 thus providing an additional safety feature to ensure a safe product.

Figure 4:
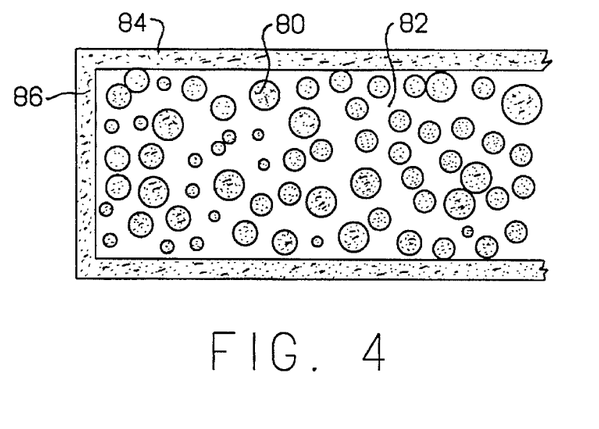
FIG. 4 is a diagrammatic representation of the cross-sectional view of the encapsulated, neutralized chemicals produced from the preferred embodiment of the invention described in FIG. 2.
Figure 5:
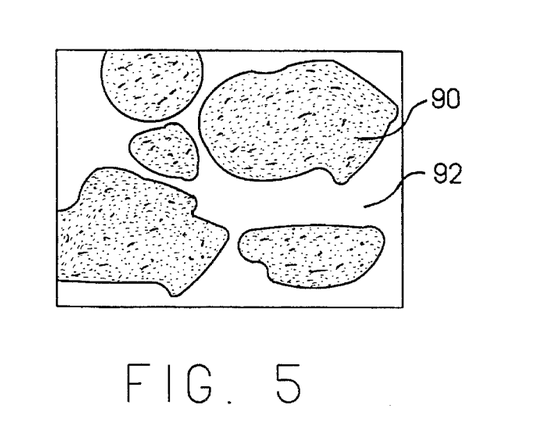
FIG. 5 is a depiction of a magnified micrograph of an encapsulated, neutralized chemical substance.
Figure 6A:
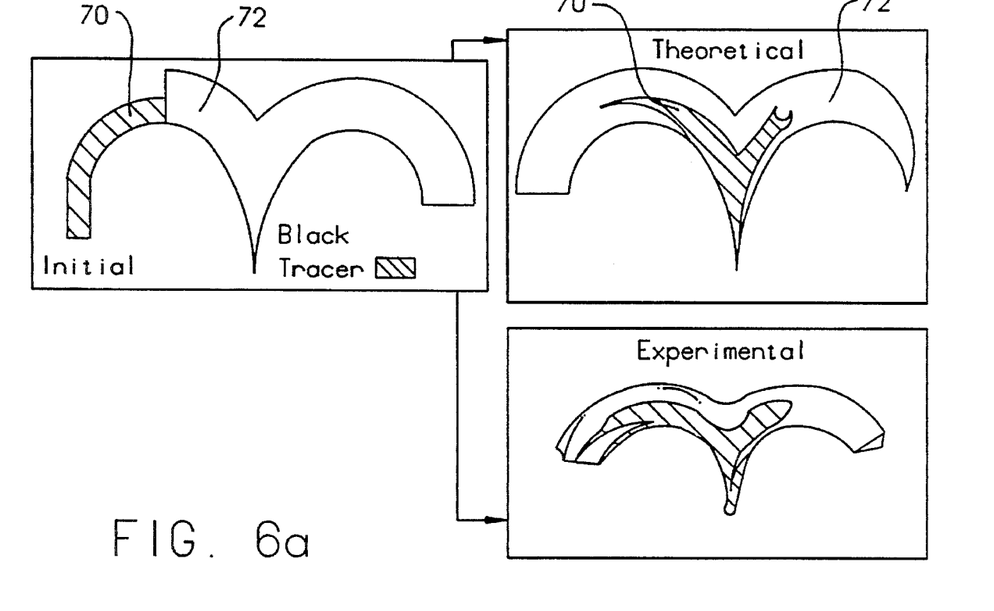
FIG. 6a illustrates experimental and actual interfacial area growth at the nip region of the regular flighted screw sections of the twin screw extruder.
Figure 6B:
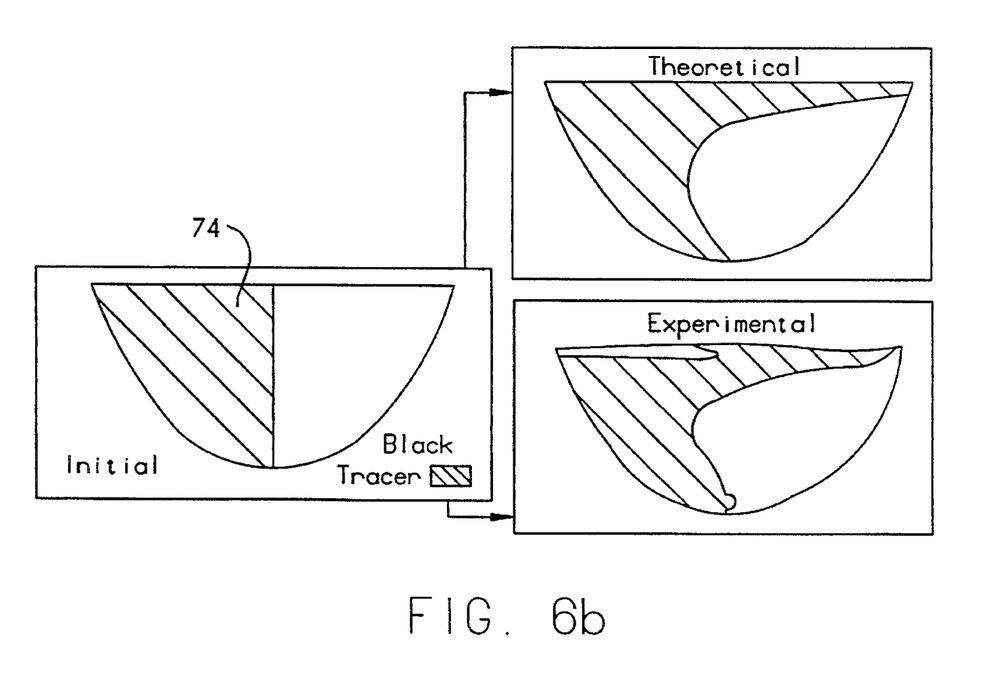
FIG. 6b illustrates experimental and actual interfacial growth away from the nip region of the regular flighted screw sections of the twin screw extruder.
Figure 7:
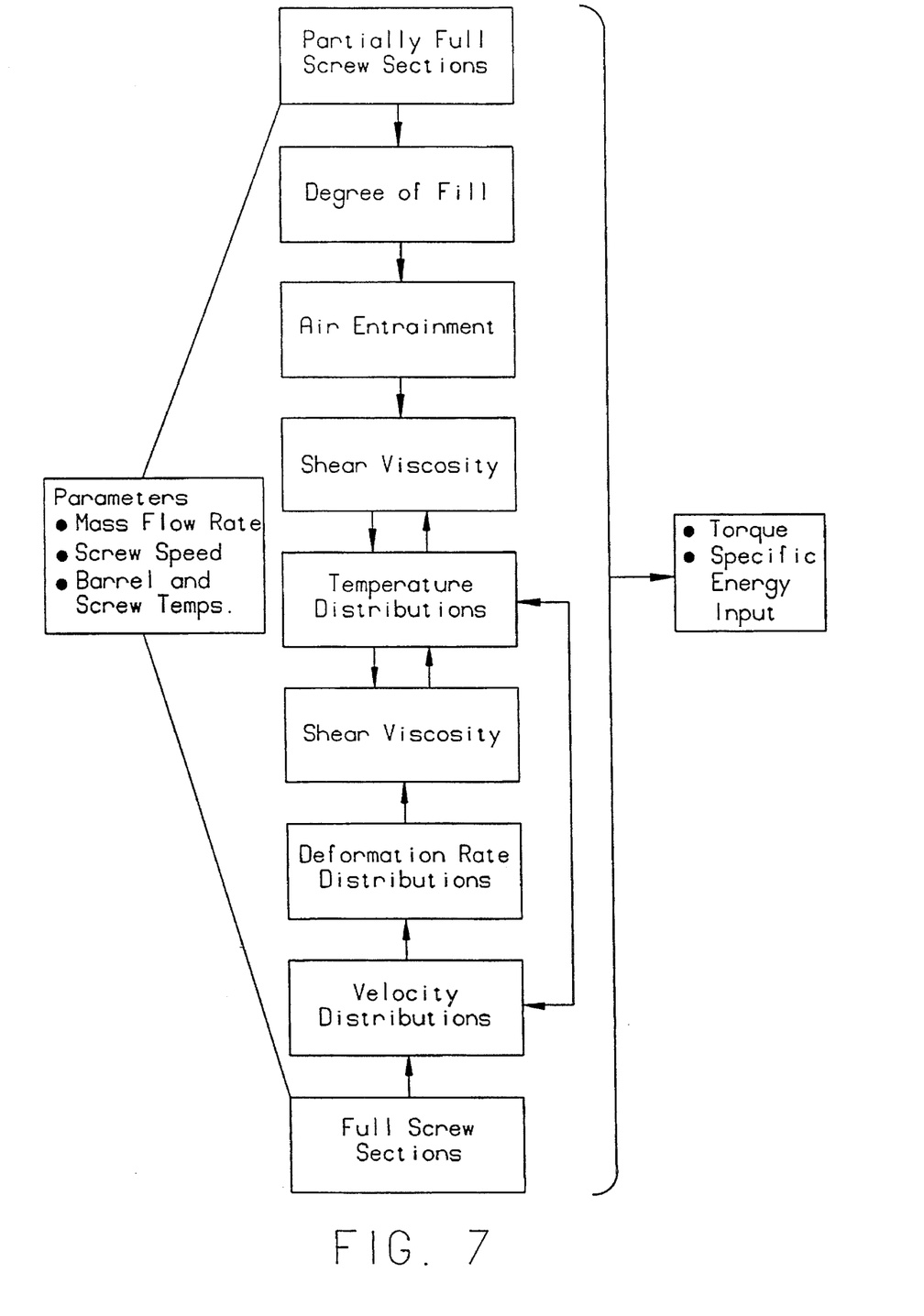
FIG. 7 illustrates the inter-relationships between variables and parameters used in twin screw extrusion.

FIG. 4 illustrates a cross section of a co-extruded and encapsulated strand. This strand comprises a neutralized chemical 80 that has been broken down into small droplets which are encapsulated in polymer 82. The droplets of chemical and polymer are then coated with additional polymer 84 to ensure that the encapsulation is complete. The ends 86 are capped with polymer as described above. As is evident, the neutralized and encapsulated chemical is completely isolated and safe for transport to a disposal plant. FIG. 5 illustrates a magnified micrograph which demonstrates the desired morphological distribution of the neutralization products 90 in the encapsulating polymer 92.

Although the toxic chemical is not neutralized one hundred percent in accordance with this process, there is little fear of toxic chemical diffusion through the polymeric encapsulation layer. Because the neutralization rate is faster than the diffusion rate, all the remaining toxic chemical will be neutralized before it has an opportunity to diffuse through the polymeric barrier sleeve. For example, with respect to the hydrolysis reaction described above from Gustafson and Martell, 10% of the GB remains in toxic form after a neutralization time of 5 minutes at 55° C. Assuming that the rate of neutralization in the more viscous stagnant encapsulating region is an order of magnitude lower than in the neutralization section at the entrance, it would take approximately thirteen hours for 99% of the remaining 10% GB to hydrolyze. On the other hand, based on a typical permeability coefficient of chlorinated materials in polyethylene or polystyrene, the permeation time through a 9 mm polystyrene barrier layer is in the order of years. Thus, diffusion presents no threat of harming those in contact with the neutralized, encapsulated products.

However, there is a threat of toxic leakage through the encapsulation layer if the neutralization and encapsulation processes are not performed correctly. The transport and mixing in an extruder is essential, and, when complete, ensures sufficient neutralization and encapsulation. The following is a description of how the workings of a twin screw extruder neutralizes and encapsulates these highly toxic chemicals. Fully flighted screw sections of the twin screw extruders are efficient in accomplishing the necessary transportation and pressurization in the forward mode, but their transport capability depends on their geometry. Generally, small helix angles and shallow channels give rise to greater conveying and pressurization capabilities in the forward mode.

When fully flighted screw sections are incorporated in the reverse direction they provide effective melt seals which capture the contents to be mixed in one area of the extruder until the pressure from the melt seal is overcome. Thus, effective mixing takes place in these "sealed" regions. In this situation, the drag direction opposes the direction of flow which generates a pressure drop over the reversely configured screw section. To overcome this pressure drop and maintain transport, the screw elements preceding this section need to provide sufficient pressurization. Thus, forward flighted sections should precede the reversely configured screw sections. Further, the total helical length of the forward section should be greater than the total helical length of the reversely configured section which follows it. The loss of pressure over the reversely configured screw sections also necessitates that the extruder be completely full at that section. Degree of fill analysis will be discussed below.

Distributive mixing is necessary for encapsulation and occurs when the various components of the solution and the polymer are moved with respect to one another so that the resultant positions of these components are different from what they were relative to one another prior to any mixing. The elements of the various components are interspersed with one another so as to form a homogenous composition of different ingredients. In the present case, distributive mixing occurs when the chemical solution and the polymer used for encapsulation are moved relative to one another so as to encapsulate the solution in the polymer.

To achieve the desired mixing, an interface orientation is introduced to the polymer and the chemical solution as they flow from one screw to the other at the nip region, i.e., where the two screws intermesh. The interface orientation occurs on the basis of the reorganization of the geometrical area of interface between the polymer and chemical solution. Such interface changes as the two ingredients become mixed. For fully-flighted screw sections, high strain values can be introduced into the materials during the entire length of the flights, and the further reorientation of the interface occurs largely at the nip region. This results in substantial encapsulation of the neutralized chemical before reaching the end of the extruder.

FIG. 6 illustrates the distributive mixing capability of the extruder. The encapsulation of a colored tracer fluid 70 in another fluid 72 is illustrated both experimentally and theoretically. The tracer fluid is initially placed at two different configurations to illustrate the encapsulation mechanisms associated with the system: FIG. *6a* illustrates distributive mixing at the nip region, and FIG. *6b* illustrates distributive mixing away from the nip region in the fully-flighted conveying and pressurization elements of the twin screw extruder. At the nip region, the growth of the reorientation occurs as a function of the relative velocity of the nip region and the width of the screw flights. A greater screw flight width results in a greater change in the fluid's path and a greater reorientation of the interfacial area between the components at the nip region. This reorientation results in better encapsulation of the detoxified chemical. Thus, by altering the screw flight width, the extent of distributive mixing at the nip can be controlled. Distributive mixing can also occur at a region along the extruder away from the nip region. For this scenario, tracer fluid 74 is positioned in one half of the channel width of a flight at an area removed from the nip region. As the extruder is operated, the fluid interface redistributes over the entire channel width resulting in encapsulation.

Dispersive mixing, which is necessary to introduce changes in the physical properties of the components of the mixture, requires a high shear stress to be applied to the mixture by passing the mixture repeatedly through small gaps at high velocities. As stated above, the dispersive mixing ability of the fully flighted screw sections is very small. Thus, to achieve dispersive mixing in the instant system, kneading discs 34 (see FIG. 3) are used. Kneading discs create large shear stresses at the interface between the sets of kneading discs by squeezing the solution and polymer mixture through the small gap between the kneading discs. This motion creates excellent dispersive mixing.

Depending on the stagger angle of the kneading discs, neutral, forward or reverse screw sections can be used to generate different stress, temperature and velocity profiles. By calendering the mixture (i.e., squeezing and pressurizing locally) at the intermesh between the two kneading discs and between the kneading discs and barrel of the extruder, axial velocities are created which can be negative or positive, depending on the direction of least resistance. This controlled back and forth motion also gives rise to flow and deformation in the kneading discs section which results in additional flow stress generating additional dispersive mixing which is very effective in rupturing large liquid drops to form small droplets.

In addition to mixing, another requirement for proper encapsulation is a proper degree of fill in the extruder cavity. Degree of fill is defined as the ratio of the volume of the solution in the extruder divided by the total volume available in the extruder, both determined over a constant axial length. The degree of fill varies with the stagger angle of the screw flights. Generally, the degree of fill and the distance over which the fully-flighted screw channel and kneading discs remain full are greater with stagger angles having negative orientations. With such reverse stagger angles there is pressure loss over the entire section. This necessitates that the entire section, and a portion of any preceding section, be completely full. This is suggested by experimental results wherein a fully flighted screw section preceding a series of kneading discs of a 30° reverse stagger angle has a higher degree of fill than that preceding a 60° reverse stagger angle section or a 90° neutral stagger angle section. Similarly, the degree of fill at a 60° forward stagger angle section is greater than that found in a 30° forward stagger section.

Finally, the third important consideration for this system (after geometry and configuration) is operating conditions. System operating conditions are selected to process at an optimum rate with respect to throughput and safety and to accommodate a particular toxic chemical so as to optimize the neutralization and encapsulation of that chemical. The primary operating conditions include mass flow rate, screw speed, and temperature of the die, barrel and screw sections. These parameters will affect the extent of mixing by controlling the residence time and distribution of the material, and the strain, stress and temperature distributions imposed on the mixture in the extruder. Under improper conditions, degradation and premature curing may occur. The amount of air incorporated into the suspension and the amount of solvents remaining in the suspension at the exit from the die will also be affected by the selection of operating conditions. The overall relationships between the different system variables and operating condition parameters are shown in FIG. 7.

The above-described disposal technology is safe due to the continuous nature of the operation. Only a small quantity of highly toxic chemical is found in the twin screw extruder at any given time. Other advantages include excellent heat transfer from the high surface to volume ratio in the extruder. The self-wiping action of the twin screw extruder elements provide self-cleaning to avoid formation of stagnant regions. The twin screw extrusion machine is equipped with computerized process control and remote operation and it does not require any manual handling. Thus, the workers are not exposed to the highly toxic chemicals. The barrel of the twin screw extruder has a splitable "clam shell" design with hydraulic actuators to allow for quick release and instantaneous flooding of the contents of the extruder with aqueous alkaline solution.

The process area is continuously monitored for possible contamination with sensors such as broad based solid state sensors. In the event of detection of any chemical warfare agent, the process will automatically shut down. In the neutralizationen-capsulation process, samples are to be withdrawn towards the end of the neutralization zone. At this location, there will be a flange, probe and solenoid valve assembly with the valve activated remotely. The extent of neutralization can be monitored by determining the total quantity of halogen ions formed during the hydrolization process of GB. Alternatively, in the neutralization of VX, the extent of reaction can be monitored by determining the pH of the sample (pH decreases as hydrolysis proceeds) and comparing it to the estimated pH of the feed. A more accurate (but also more expensive) approach for monitoring the progress of the reaction is to analyze the parent molecule, i.e., GB, HD or VX through the liquid chromatography/mass spectrometry (LC/MS) technique. LC/MS is used as a technique for the identification and quantification of the highly toxic chemical and its products after hydrolysis. Thus, LC/MS can be used to determine both the required system for neutralization and encapsulation of the highly toxic chemical and the stage of the hydrolysis reaction (i.e., determining whether the chemical has been neutralized). The output can be compared with predetermined values to be used as feedback for computerized process control.

Further, the disposal technology is mobile so that the plant can be taken from site to site thereby greatly decreasing costs as only one of these processing stations need be built.

While it is apparent that the invention herein disclosed fulfills the objects above stated, it is recognized that numerous embodiments and modifications may be devised by those skilled in the art and it is intended that the appended claims cover all such modifications and embodiments as fall within the true spirit and scope of the present invention. Other types of processors may be used to concomitantly neutralize and encapsulate the neutralization products. Other continuous processors include continuous kneaders, counter-rotating twin screw extruders, and single screw extruders. Batch processors can also be used, but are less efficient. The preferred embodiment assumes that the toxic chemicals will be in containers or in weapons, which can be disassembled so that the toxic chemical can be removed therefrom. In the event that the weapons cannot be disassembled, they can be cryogenically broken into small pellets, which can be fed together with the toxic chemicals into the continuous processor for concomitant neutralization and encapsulation.

The disposal method of this invention applies equally to any chemical or other hazardous solution which cannot be handled by humans in its present state. These include but are not limited to chemically contaminated soil and groundwater, industrial chemicals or chemical waste, such as halogenated organic chemicals other than chemical warfare agents, found in major dump sites such as the Superfund locations. With minor modifications to the feeding mechanisms, processing configuration and geometry, encapsulation materials and operating conditions, these chemicals can be disposed of using the neutralization and encapsulation method of the invention.

The process can be automated by equipping it with robotics-based sample collection systems which would collect samples from individual storage containers and analyze them for precise chemical content. The composition of the sample can also be determined with LC/MS analysis. The analysis of the chemical nature of the sample can then be carried out (with or without human intervention) to determine the chemical treatment necessary to neutralize the chemical targeted for treatment. Upon the findings of this analysis, a computerized menu can select the proper neutralization agent, the optimal encapsulating polymers, the configuration and geometry of the various extruder elements, the necessary quantities of elements of the process and the proper operating conditions for the neutralization and encapsulation of the particular chemical. Various sections of the extruder can be modified by employing remotely activated adjustable screw elements. The sampling system can also be installed directly in the feed line leading to the extruder.

EXAMPLE

The following example describes the result of a series of neutralization and encapsulation experiments performed on the twin-screw extruder apparatus described in detail above. The experiments concerned neutralizing a simulant with NaOH, and encapsulating the simulant with a twin screw extruder in a thermosetting polymer.

Specifically, the simulant comprised an aqueous solution of 200 ppm (w/w) trichloroethylene. Neutralization was performed by mixing 2 ml batches of 10N NaOH solution with 700 ml of simulant in a well stirred vessel at 100° C. for two hours. This resulted in 95% neutralization. The neutralization products were mixed with 0.5% by weight crosslinked acrylic acid polymer to form a hydrogel. To achieve encapsulation, the hydrogel was fed into the twin screw extruder at a constant mass flow rate of 5.6 lb per hour. An epoxy polymer of a diglycidyl ether of bisphenol-A was used as the encapsulating polymer and was fed into the extruder at 8.4 lb. per hour. A curing agent of precatalyzed trifunctional mercaptan based hardener with tertiary amine was also fed into the extruder at 8.4 lb per hour. The extruder was maintained at 57° F. with a screw speed of 30 rpm.

Figure 8:
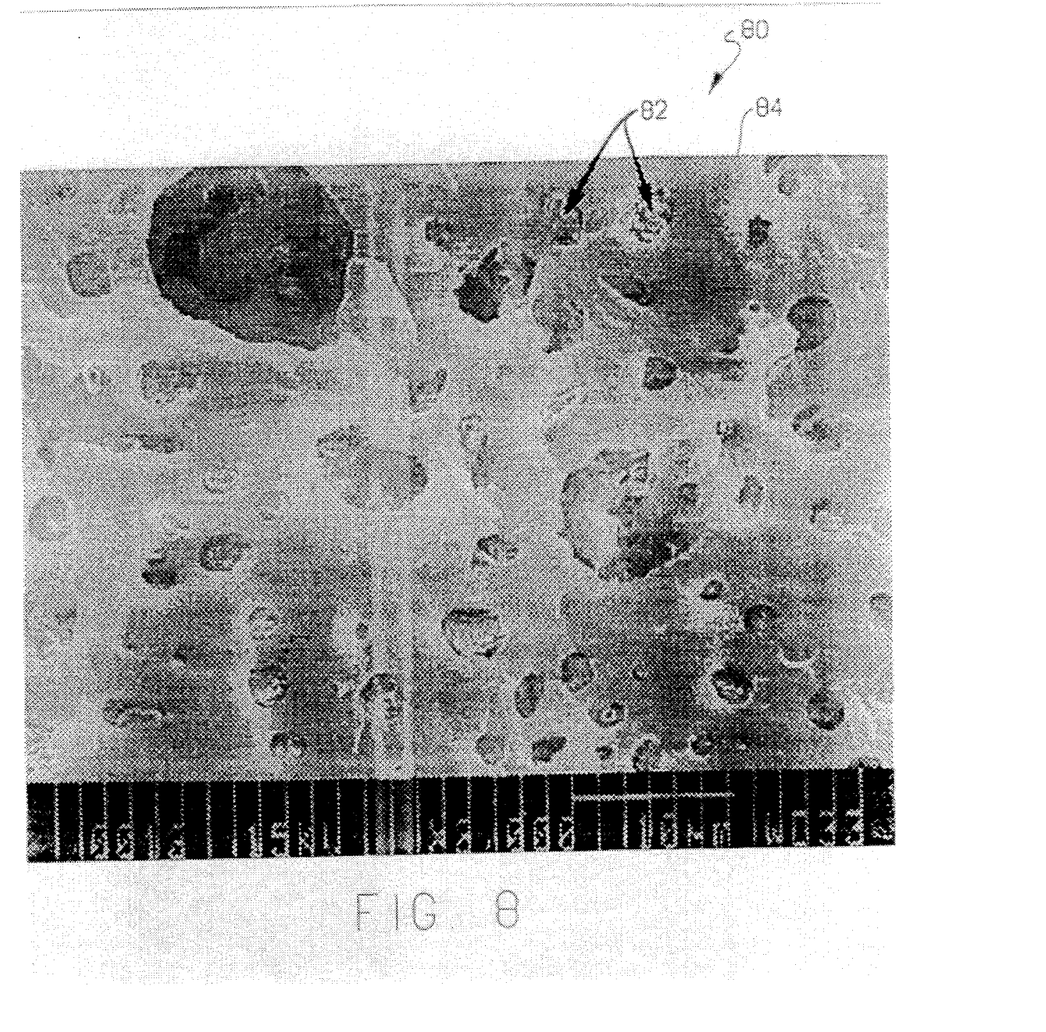
FIG. 8 is a scanning electron micrograph of encapsulated simulant chemical using twin screw extrusion.

Upon completion of the screw operations the formulation was well mixed, as is evident from FIG. 8 which is a reproduction of a photograph 80 of the extruder products of the above-described example taken by a scanning electron microscope and magnified 2,000 times. The hydrogel 82 was thoroughly and uniformly mixed with the epoxy polymer 84 and finely dispersed in the polymer. Specifically, the mean diameter of the hydrogel deposits was approximately 2.4 micrometers and the mean distance of epoxy polymer between hydrogel deposits was approximately 4.4 micrometers. Thus, hydrogel deposits were well encapsulated in the epoxy polymer. With the use of a second extruder to cover the formulation with a 1–5 mm coating of encapsulating polymer (as described above), the formulation would be sufficiently encapsulated so that it would be safe for transport.

What is claimed is:

1. A method of disposing of chemical warfare agents comprising the steps of:

chemically neutralizing the chemical warfare agents with at least a stoichiometric amount of neutralizing solution to achieve at least 90 percent conversion of the agent and to form neutralization products;

encapsulating the neutralization products by embedding the neutralization products in an encapsulation substance to form a strand and then forming a sleeve around said strand by surrounding said strand with an additional encapsulation substance;

said steps of chemically neutralizing the chemical warfare agents and encapsulating the neutralization products ensuring that any unconverted chemical warfare agent cannot leak out of the sleeve.

2. The method of claim 1 wherein the chemical warfare agents are selected from the group consisting of nerve agents GB and VX and mustard agent HD.

3. The method of claim 1 wherein the neutralizing solution neutralizes the highly toxic chemicals via a hydrolysis process.

4. The method of claim 1 wherein said step of chemically neutralizing comprises the steps of:

mixing the chemical warfare agent with a neutralizing solution for that agent in a mixing head; and extruding the mixture in a continuous processor.

5. The method of claim 4 further comprising the step of using a neutralizing solution to wash drained containers of chemical warfare agent.

6. The method of claim 4 further comprising the step of incorporating a polymeric thickener in the mixture of the chemical warfare agent and the neutralizing solution.

7. The method of claim 6 wherein the polymeric thickener is incorporated in a second mixing head.

8. The method of claim 4 wherein said continuous processor is configured to provide a residence time and temperature sufficient for chemical neutralization to ensure at least a 90 percent conversion of the chemical warfare agent.

9. The method of claim 8 wherein said residence time is achieved by selecting the processor configuration to isolate a neutralization section of said continuous processor for a predetermined time period.

10. The method of claim 1 wherein said step of encapsulating comprises the steps of:

converting the neutralization products into a gel via the addition of a polymeric thickener;

dispersing the neutralization products as small droplets;

embedding the small droplets of neutralization products in a thermosetting or thermoplastic polymeric matrix to form a strand; and coating the strand with a polymeric melt.

11. The method of claim 10 wherein the polymeric matrix comprises a thermoset.

12. The method of claim 10 wherein the polymeric matrix comprises a thermoplastic.

13. The method of claim 10 wherein said converting step occurs in a continuous processor which is configured to mix and pressurize the neutralization products and the polymeric matrix;

said dispersing step occurs in said continuous processor which is configured to create distributive and dispersive mixing; and said embedding step occurs in said continuous processor which is configured to ensure that said droplets of neutralization products are surrounded by the polymeric matrix.

14. The method of claim 10 wherein said coating is applied from a second continuous processor.

15. The method of claim 10 further comprising applying additional coatings on said strand that aid in enhancing the encapsulation of the neutralization products.

16. The method of claim 1 further comprising the step of determining the extent of neutralization by analyzing products formed.

17. The method of claim 1 further comprising the step of monitoring and controlling operating conditions in said continuous processor to optimize processing for the particular chemical warfare agent.

18. The method of claim 17 wherein the operating conditions comprise mass flow rate, screw speed and temperature.

19. The method of claim 1 further comprising the steps of monitoring portions of the apparatus that should not contain the chemical warfare agent and automatically shutting down the apparatus if any chemical warfare agent is detected.

20. A method of disposing of chemical warfare agents comprising the steps of:

mixing the chemical warfare agent with a suitable and at least a stoichiometric amount of neutralizing solution;

incorporating a thickening agent to render the mixture of chemical warfare agent and neutralizing solution more viscous;

introducing the mixture of chemical warfare agent, neutralizing solution and thickening agent into a continuous processor;

maintaining the mixture in said continuous processor for a sufficient residence time and temperature level to ensure at least 90 percent conversion of the chemical warfare agent and to form neutralization products;

dispersing the neutralization products into small droplets while embedding said droplets in a polymeric matrix to form a strand; and forming a sleeve around said strand by surrounding said strand with a polymer melt originating from a continuous processor;

said steps of maintaining said mixture in said continuous processor until at least 90 percent of the chemical warfare agent is converted, dispersing and embedding said droplets in said polymeric matrix and then forming a sleeve around said converted agent ensuring that any residual chemical warfare agent cannot diffuse through said polymeric sleeve.

21. The method of claim 20 further comprising the steps of:

curing said strand and sleeve in the case where the polymers of said strand and sleeve are thermosetting polymers or cooling said strand and sleeve in the case where the polymers of said strand and sleeve are thermoplastic polymers; and feeding said strand and sleeve into closed containers so that the encapsulated neutralization products can be safely transported for final disposal.

22. The method of claim 20 further comprising the step of maintaining the degree of fill in said continuous processor at a level sufficient to ensure proper neutralization and encapsulation.

23. A product of a disposal method for chemical warfare agents comprising:

small droplets of neutralization products formed by mixing the agents with at least a stoichiometric amount of neutralizing solution to ensure at least 90 percent conversion of the chemical warfare agent, said droplets being embedded within a polymeric material; and an additional polymeric material surrounding said droplets embedded within polymeric material so as to shield said droplets from contact with anything outside said additional polymeric material.

24. The product of claim 23 further comprising additional coatings that aid in enhancing the encapsulation of the neutralization products applied to said additional polymeric material.

* * * * *